(12) United States Patent (10) Patent No.: US 12,584,806 B2

Kochan, II et al. (45) Date of Patent: Mar. 24, 2026

(54) LOAD CELL CONDITIONING MACHINE

(71) Applicant: PAR Excellence Systems, Inc., Cincinnati, OH (US)

(72) Inventors: Thomas J. Kochan, II, Brighton, MI (US); Stanley S. Copeland, Saint Louisville, OH (US); Thaddeus MacKrell, Gross Pointe City, MI (US); Randy Hensler, Cincinnati, OH (US)

(73) Assignee: PAR Excellence Systems, Inc., Cincinnati, OH (US)

( * ) Notice: Subject to any disclaimer, the term of this patent is extended or adjusted under 35 U.S.C. 154(b) by 0 days.

(21) Appl. No.: 19/237,788

(22) Filed: Jun. 13, 2025

(65) Prior Publication Data

US 2025/0383246 A1 Dec. 18, 2025

Related U.S. Application Data

(60) Provisional application No. 63/659,665, filed on Jun. 13, 2024.

(51) Int. Cl.

| | |
|---|---|
| B23P 19/00 | (2006.01) |
| G01L 1/22 | (2006.01) |
| H02K 5/04 | (2006.01) |
| H05K 13/04 | (2006.01) |

(52) U.S. Cl.

CPC .............. G01L 1/2268 (2013.01); H02K 5/04 (2013.01)

(58) Field of Classification Search

CPC ................................. G01L 1/2268; H02K 5/04

See application file for complete search history.

(56) References Cited

U.S. PATENT DOCUMENTS

| | | | | |
|---|---|---|---|---|
| 11,432,613 | B2 * | 9/2022 | Choi | ..................... A43B 7/00 |
| 12,330,864 | B2 * | 6/2025 | Halperin | ............... B65D 90/48 |
| 2012/0167657 | A1 | 7/2012 | Bormann et al. | |
| 2014/0144714 | A1 * | 5/2014 | Kjar | ..................... G01L 1/26 |
| | | | | 177/124 |
| 2014/0262558 | A1 | 9/2014 | Johnson | |
| 2015/0226601 | A1 | 8/2015 | Perrea et al. | |

FOREIGN PATENT DOCUMENTS

| | | |
|---|---|---|
| GB | 1109176 A | 4/1968 |
| WO | 2007083125 A1 | 7/2007 |
| WO | 2023067128 A1 | 4/2023 |

OTHER PUBLICATIONS

Int'l. Search Report and Written Opinion, PCT/US2025/033530, Aug. 14, 2025, ISA/US.

* cited by examiner

*Primary Examiner* — Paul D Kim

(74) *Attorney, Agent, or Firm* — FBT GIBBONS LLP

(57) ABSTRACT

A load cell conditioning machine is provided. The load cell conditioning machine includes a frame assembly; a weight platform assembly mounted within the frame assembly; one or more load arm assemblies in operative communication with the weight platform assembly; one or more load cell fixture support assemblies in operative communication with the load arm assembly; and a motor mount assembly mounted within the frame assembly to provide power to the weight platform assembly. One or more load cells are securable within the one or more load cell fixture support assemblies and the one or more load arm assemblies. The motor mount assembly powers the weight platform assembly to condition the one or more load cells by applying a load beyond a rated capacity of the one or more load cells.

12 Claims, 10 Drawing Sheets

LOAD CELL CONDITIONING MACHINE

CROSS REFERENCE TO RELATED APPLICATION

This application claims the priority benefit of U.S. Provisional Patent Application No. 63/659,665, filed Jun. 13, 2024, which is hereby incorporated by reference in its entirety.

BACKGROUND

Load cells are transducers designed to convert force or load applied to an object into an electrical signal. These devices play a crucial role in various applications where precise measurement of force or weight can be essential. Load cells are commonly used in industrial settings, such as manufacturing, material testing, and process control, as well as in everyday consumer products like bathroom scales. They function based on the principle of strain gauges-small sensors that deform when subjected to force, causing a change in electrical resistance. Load cells are often constructed with multiple strain gauges arranged in a specific configuration to enhance sensitivity and accuracy. With a force applied to the load cell, the strain gauges undergo deformation, and the resulting change in resistance can be measured. This change can then be converted into an electrical signal, typically in the form of voltage, which can be calibrated and interpreted to determine the magnitude of the applied force.

There are various types of load cells available, each suited for specific applications and load ranges. Common types include compression load cells, tension load cells, and shear load cells. Compression load cells are designed to measure forces pushing together, tension load cells measure forces pulling apart, and shear load cells are suitable for forces applied parallel to the surface of the cell. Load cells are critical components in systems that require precise control and monitoring of force, ensuring accurate measurements and reliable performance in a wide range of industries.

During the manufacturing process of load cells, residual stresses, such as drift and creep, are introduced within the load cells due to forming or machining of the material used to create the load cells. These residual stresses can negatively affect the load cell performance. The strain gauges attached to the load cell rely on the body of the load cell deforming in a specific way to be able to give an accurate read out on the strain being applied.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Figure 1:
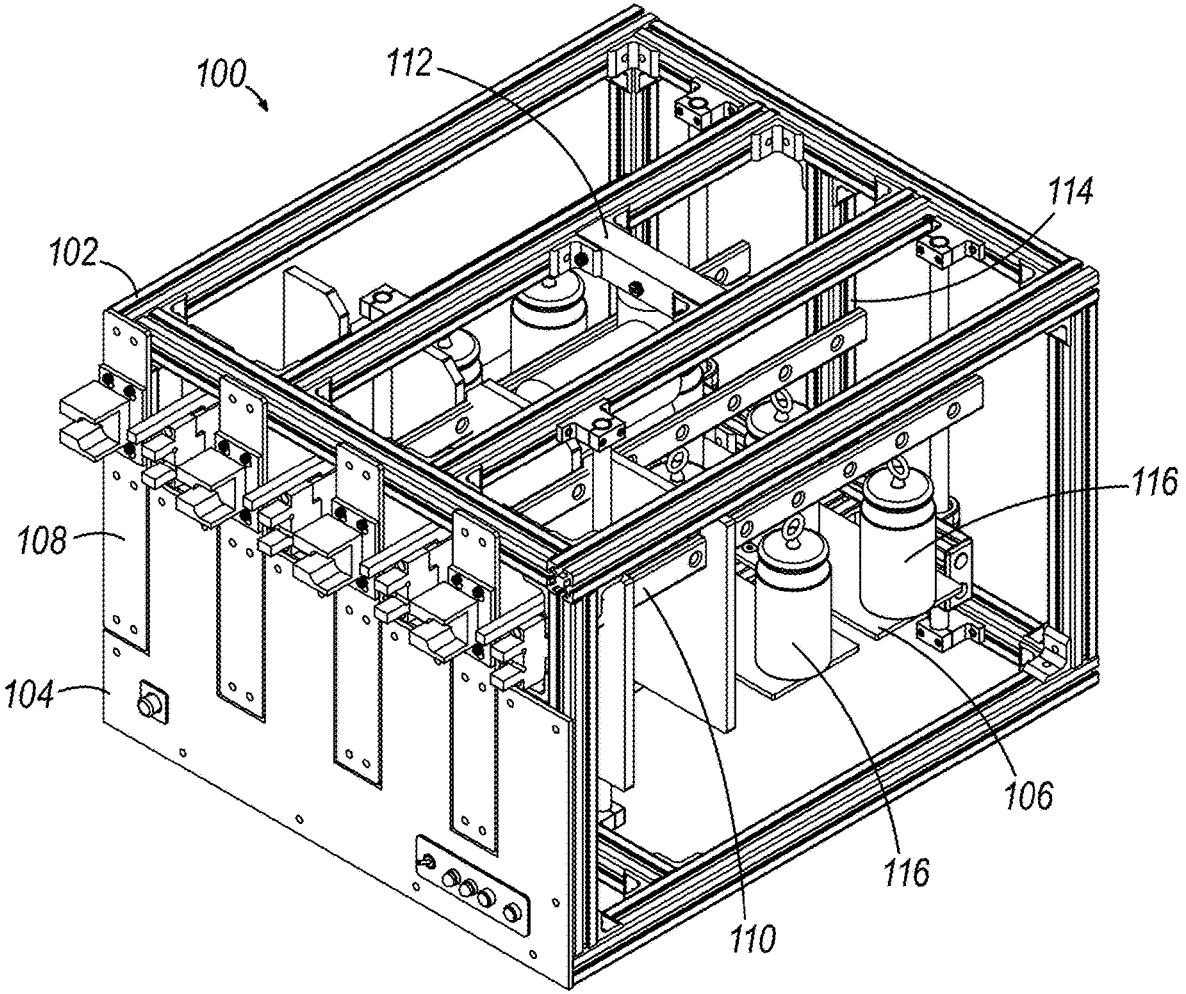
FIG. 1 depicts a perspective view of a load cell conditioning assembly according to an embodiment of the present disclosure.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

It will be appreciated that any one or more of the teachings, expressions, versions, examples, etc. described herein may be combined with any one or more of the other teachings, expressions, versions, examples, etc. that are described herein. The following-described teachings, expressions, versions, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Figure 2:
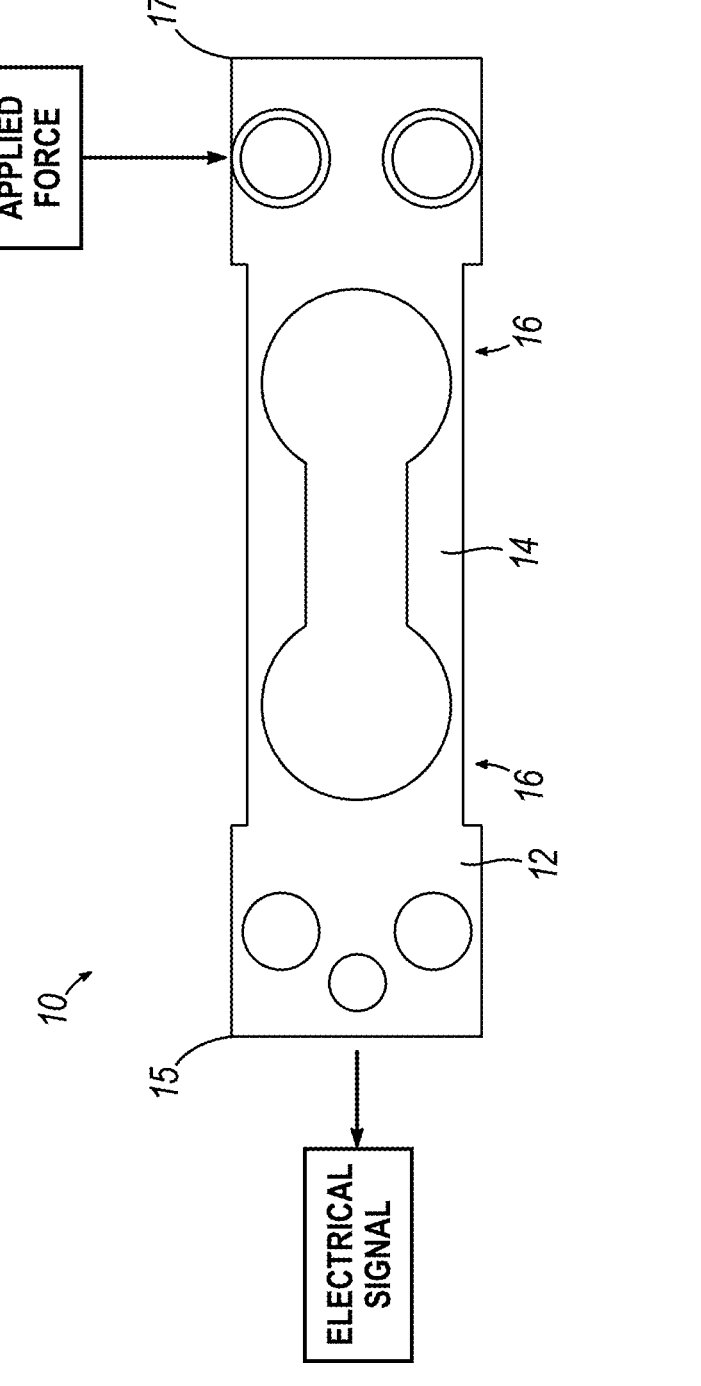
FIG. 2 depicts a side view of a load cell according to an embodiment of the present disclosure.

FIG. 1 depicts an example embodiment of a load cell conditioning machine 100. In one or more embodiments, the main components of the machine 100 include a frame assembly 102, an enclosure front assembly 104, a weight platform assembly 106, a load cell fixture support assembly 108, a load arm assembly 110, a motor mount assembly 112, and a photoelectric sensor assembly 114. In one or more embodiments, the machine 100 may be used to apply a controlled load onto a load cell(s) before they are integrated into a device, such as a scale. An example of a load cell 10 is shown in FIG. 2.

Load cells, such as load cell 10 described herein, are generally manufactured using materials and techniques that do not compress all of the minor deformations, weaknesses, or other features of the load cell material. The result of such a manufacturing process is that, over time, a load cell will have a drifting weight or otherwise become imprecise as the deformations are compressed out with use. While such imprecisions may be immaterial in low stakes circumstances, in commercial settings, medical settings, and the like, such inaccuracies can have health and financial implications.

Embodiments described herein may reduce the likelihood and impact of scales becoming inaccurate by pre-stress, or otherwise pre-treating, load cells such as load cell 10. In an embodiment, an off-the-shelf load cell is subjected to stresses, weights, or other environmental conditions to remove deformations or other features of the material that would normally occur over a period of time. By pre-treating the load cells, the treated load cell may not further deform or change over time, or do some nominally, so that the load cell does not need to be recalibrated. In certain environments, such as medical environments, where it is different, time-consuming, or impractical to re-tare scales regularly it may be highly advantageous to provide a load cell that does not need to consistently re-tared.

It will be appreciated that any suitable machine or mechanism can be used to stress, treat, pre-treat, or otherwise condition a load cell. Such conditioning can include weight or mass-based conditioning, temperature conditioning, chemical conditioning, or any other suitable technique.

In one or more embodiments, load cell 10 has a body 12 that can be specifically machined so that as force is applied, the middle section 14 of the cell 10 deforms in a specific manner. In one or more embodiments, located along the body 12 of the load cell 10 are strain gauges 16 that are secured to body 12 and arranged electrically in a bridge. In one or more embodiments, body 12 of load cell 10 can be made from a metal, such as aluminum. Strain gauges 16 are sensors whose electrical resistance varies with applied force. In one or more embodiments, the strain gauges 16 convert or transduce weight into a current in electrical resistance which can then be measured. With a load applied to load cell 10, the body 12 displaces and deforms, which can then be measured as strain by the strain gauges 16.

In one or more embodiments, a load cell 10 may be placed into one of the load cell fixture support assemblies 108 such that a first end 15 of the load cell 10 can be secured into position. A second end 17 of load cell 10 may then be placed into an end of one of the load arm assemblies 110 in a non-secured position. Once loaded as such, the weight platform 106 can be lowered, which allows for the weights 116 loaded onto the load arm assembly 110 to drop. The mass of weights 116 are selected such that the load applied by the weights 116 can be beyond the rated capacity of the load cell 10, but within its ultimate capacity.

The rated capacity of a load cell refers to the maximum load that a load cell, such as load cell 10, is designed to measure accurately. The rated capacity is typically specified in units of force, such as kilograms (kg) or pounds (lbs.) and indicates the amount of force that the load cell can handle without experiencing damage or deformation beyond acceptable limits. When the load applied is beyond the rated capacity of the load cell and it deforms, the more repeatable and consistent that deformation is, correlates with the repeatability and consistency of its ultimate measurements. When a load cell undergoes the conditioning process within machine 100, the mechanical load redistributes the stresses in the direction of intended use. If a condition load cell is used properly, having the load cell conditioned beyond the rated capacity of the load cell and then calibrated within the load cell's capacity, ensures there will be no damage to the load cell once it's in the hands of an end user. Unless the end user misuses a load cell and overloads it, the load applied during the conditioning process within machine 100 should be the largest load in the load cell experiences in its lifetime. This takes out most of the drift/creep in the load cell and creates very repeatable and consistent deformation.

As stated above, the load applied during the conditioning process within machine 100 can also be applied to the load cell 10 in the exact direction that a load may be applied to load cell 10 when load cell 10 may be utilized within a device, such as a scale. In other words, load cells 10 condition within machine 100 receive their conditioning load in the same direction stress will be applied to the load cells 10 during their use, which leads to a more consistent reading from the conditioned load cells 10. This specific load direction application allows the load cell 10 to be conditioned for its intended use.

As stated above, the conditioning process done by the machine 100 can take out most of the drift and creep in the load cell 10 and creates a repeatable and consistent deformation. Another advantage of the conditioning process done by machine 100 can be that the device that utilizes the conditioned load cells 10, such as a scale, may only need to be calibrated and tared once. There is not a need to tare the scale in between measurements or anytime during its life unless the item being weighed has changed. The benefits provided to the load cells 10 by the machine 100 reduce drifting in the measurements over time provided by the conditioned load cells 10, while also reducing hysteresis which ultimately results in a better performing and more reliable conditioned load cell 10.

It is important to note the difference between the conditioning done by the machine 100 of the present disclosure, and what is known as scale calibration. Scale calibration is the process by which the measured voltage is converted to a weight value in grams. Scales vary in their manufacturing slightly. There is no such thing as a true "zero." The load cell always outputs some voltage. When there is no load on the scale, the measured voltage ranges from somewhere between OV and 5V, but not exactly OV or 5V. The analog to digital converter in most scales converts that voltage to a 24-bit number between 0 and 16,777,215. Those numbers by themselves are not usable in a normal configuration so the following process converts that 24-bit number to a weight.

A scale generally needs to be unloaded and tared. Taring a scale typically means taking the measurement from the analog to digital converter with no load (no load meaning nothing over the parts of the scale that are permanently attached. The measurement can then be stored as the "tar value." A known weight is then placed on the scale and the 24-bit measurement can be taken again. The measurement can then be stored as the "weigh value." The tare value can then be subtracted from the weigh value. This gives the actual analog to digital "weight" of the item. For example, if the known item's weight is 5 kg or 5,000 g, you would divide the known weight by the actual analog to digital value. This gives the weight in grams per each "bit" of analog to digital value. This value can then be saved to a database and used as a multiplier to convert the analog to digital value to a weight in grams from then forward. In one or more embodiments, conditioned load cells 10 of the present disclosure can be used within cantilever scales, platform scales, suture scales, and/or catheter scales.

Figure 3:
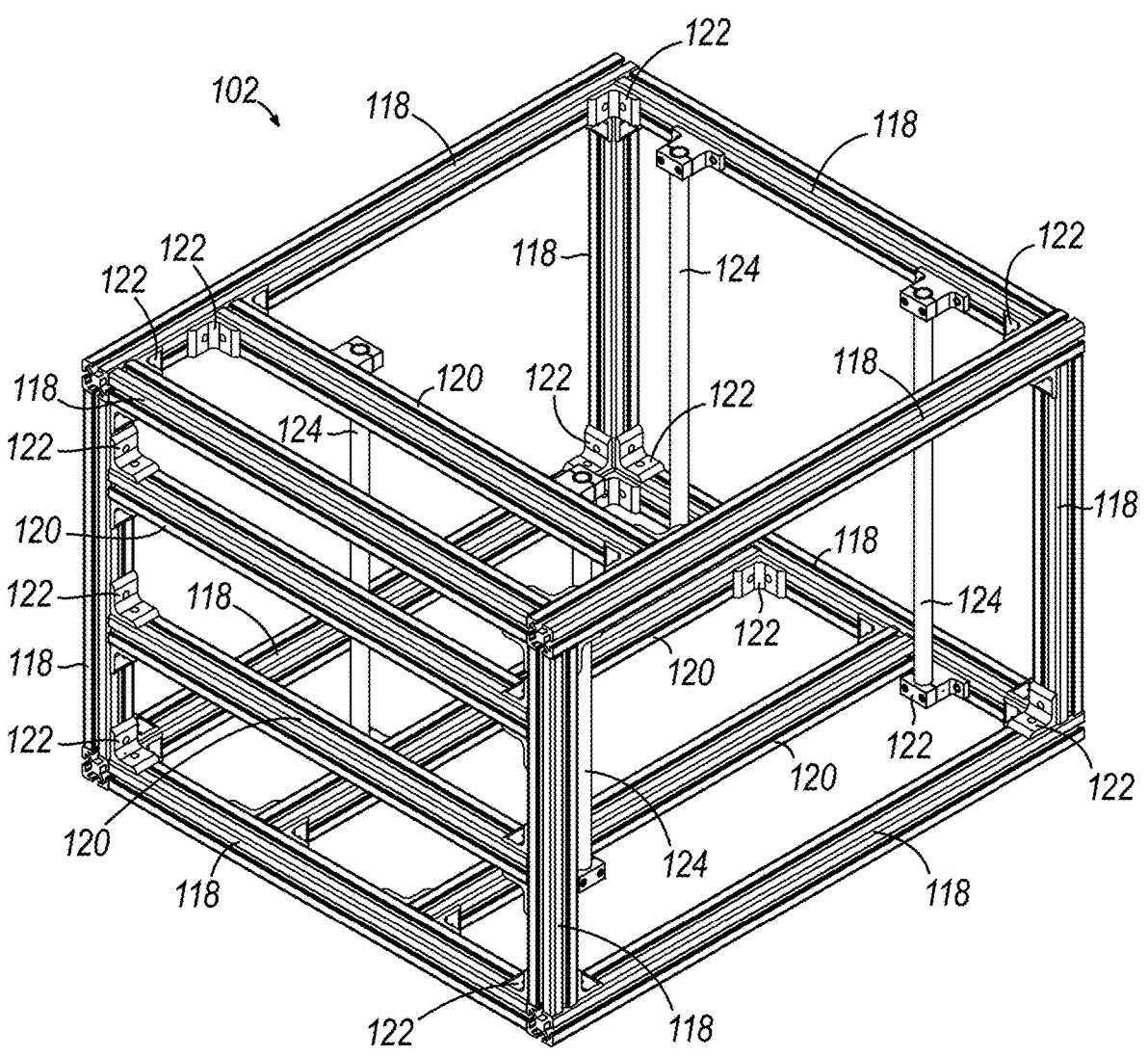
FIG. 3 depicts a perspective view of a frame assembly of the load cell conditioning assembly of FIG. 1.

FIG. 3 shows an exemplary embodiment of a frame assembly 102 of the machine 100. The frame assembly 102 may generally be needed to contain and house the other assemblies of machine 100, such as but not limited to an enclosure front assembly 104, weight platform assembly 106, load cell fixture support assembly 108, load arm assembly 110, motor mount assembly 112, and photoelectric sensor assembly 114. In one or more embodiments, the frame assembly 102 can be made from a metal, such as stainless steel, aluminum, or combinations thereof. In one or more embodiments, the frame assembly 102 includes a plurality of exterior frame support beams 118 and a plurality of interior frame support beams 120. Although a plurality of exterior frame support beams 118 and interior frame support beams 120 are shown, the overall frame assembly 102 can include more or less exterior frame support beams 118 and interior frame support beams 120.

At each connection point between an exterior frame support beam 118 and another exterior support beam 118 can be a corner bracket 122 utilizing a fixation device, such as one or more screws or bolts. At each connection point between an exterior frame support beam 118 and an interior support beam 120 can be a corner bracket 122 utilizing a fixation device, such as one or more screws or bolts. In one or more embodiments, the frame assembly 102 also includes a plurality of base-mounted shaft supports 124 that are utilized to allow elements of the weight platform 106 to move up and down as will be discussed in further detail below. The plurality of base-mounted shaft supports 124 are secured in position on the frame assembly 102 through the use of additional corner brackets 122 utilizing a fixation device, such as one or more screws or bolts.

Figure 4:
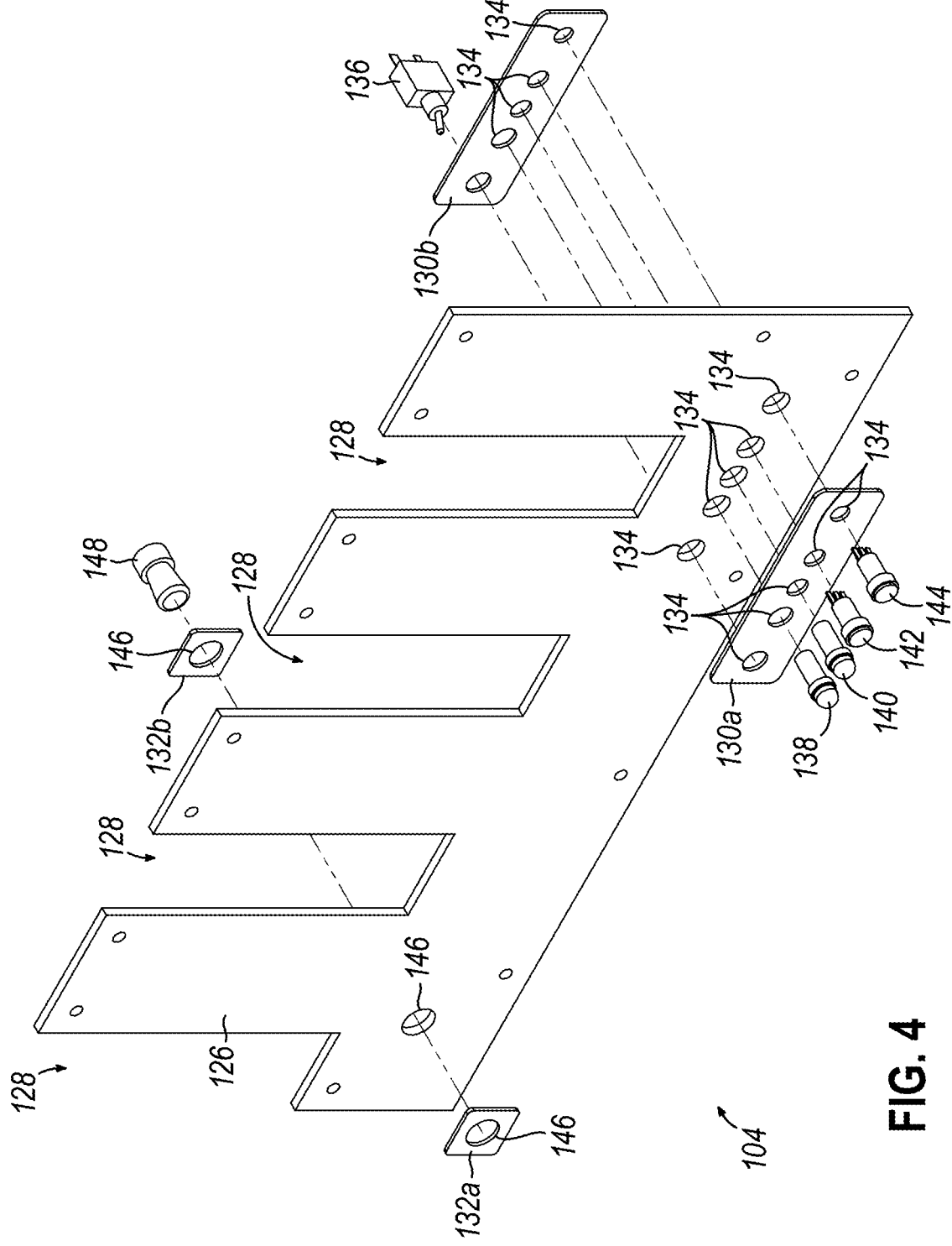
FIG. 4 depicts a perspective view of an enclosure front assembly of the load cell conditioning assembly of FIG. 1.

FIG. 4 shows an exemplary embodiment of an enclosure front assembly 104 of the machine 100. The enclosure front assembly 104 may generally be needed to protect the user of machine 100 from the conditioning process, while also providing a support body for elements of machine 100, such as load cell fixture support assembly 108 and mounting points for various electronic elements, as will be discussed below in more detail. In one or more embodiments, the enclosure front assembly 104 includes a body 126. The body 126 includes apertures 128 that provide a position for the load cell fixture supports 108 to be placed as will be discussed in further detail below. The enclosure front assembly 104 also includes a front control panel 130a, a rear control panel 130b, a front emergency stop (E-Stop) panel 132a, and a rear E-Stop panel 132b. The front and rear control panel 130a/b are secured to the body 126 through a fixation device, such as one or more screws or an adhesive. The front and rear control panel 130a/b include a plurality of apertures 134, which each can respectively align with a plurality of apertures 134 in the body 126 into which various elements of the control system of machine 100 can be placed.

In one or more embodiments, the front and rear control panel 130a/b include an aperture 134 which can house a weight switch controller 136, an aperture 134 that can house an "unsafe to handle" indicator 138, an aperture 134 that can house a "safe to handle" indicator 140, an aperture 134 that can house a stop controller 142, and an aperture that can house a start controller 144. In one or more embodiments, the weight switch controller 136 can be in the form of a toggle switch that can allow the machine 100 to switch between utilizing one of two different testing weights 116 to be used by the weight platform 106. In one or more embodiments, the first testing weight 116 can be a weight needed to condition a 5 kg load cell 10 and the second testing weight 116 can be a weight needed to condition a 10 kg load cell. The weight switch controller 136 determines if the first testing weight 116, or both the first testing weight 116 and the second testing weight 116 are utilized. The first testing weight 116 will always be utilized. In one or more embodiments, the "unsafe to handle" indicator 138 can be in the form of a red lightbulb and can be illuminated with the machine 100 in a condition in which it can be unsafe for a user of machine 100 to handle the load cell(s) 10 being conditioned by the machine 100. In one or more embodiments, the "unsafe to handle" indicator 138 can be illuminated when the load cell(s) 10 are actively being conditioned by the machine 100.

In one or more embodiments, the "safe to handle" indicator 140 can be in the form of a green lightbulb and can be illuminated with the machine 100 in a condition in which it may be safe for a user of machine 100 to handle the load cell(s) 10 being conditioned by the machine 100. In one or more embodiments, the safe to handle indicator 140 can be illuminated when the load cell(s) 10 are not actively being conditioned by the machine 100. In one or more embodiments, the stop controller 142 can be in the form of a red push button and the stop controller 142 should be engaged by the user of machine 100 when the machine 100 has entered a fault state. Fault states typically occur when a user misuses one of the load cell fixture support assembly 108, which jams the motor, and stops the actuator 182 from being able to move the weight platforms 160. When in such a fault state, the machine 100 may not be able to accept any new inputs until the stop controller 142 has been activated, which clears the fault state. In one or more embodiments, the start controller 144 can be in the form of a green push button and the start controller 144 can be activated when the user is ready for the machine 100 to begin the conditioning process.

In one or more embodiments, the front and rear E-stop panels 132a/b include an aperture 146 that may align with an aperture 146 in the body 126 that can house an E-stop controller 148. In one or more embodiments, the E-Stop controller 148 can be in the form of a red push button and the E-Stop controller 148 should be engaged by the user of machine 100 when a user needs to actively stop a conditioning cycle as the machine 100 conditions the load cell(s) 10. While it is unlikely that a conditioning cycle would need to be actively stopped, one situation that could arise would be is a user somehow got a finger stuck in a pinch point of the machine 100 and hit the start controller 144. In one or more embodiments, two machines 100 can set up in series to double the amount of load cells 10 that can be conditioned at one time. In such a situation, the activation of any E-Stop controller 148 in the series can stop the conditioning process on both machines 100. When an E-stop controller 148 becomes activated, the machine(s) 100 can enter a fault state as discussed above, and only activation of a stop controller 142 can clear the fault state. Having suitable safety system, such as those described above, may reduce the chances of injury to users utilizing machine 100 or to permanent damage being done to load cell(s) 10 being conditioned by machine 100.

Figure 5:
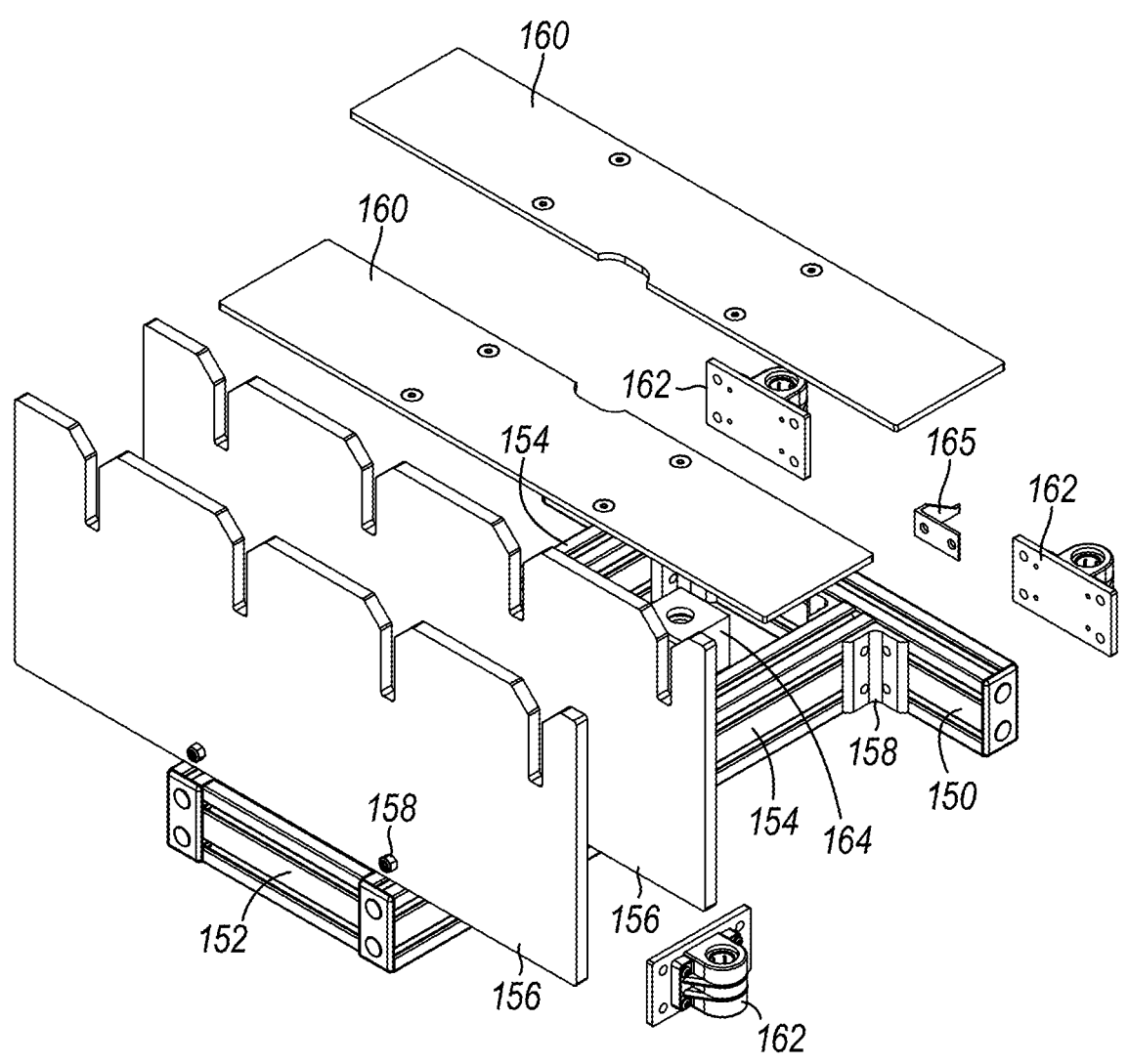
FIG. 5 depicts a perspective view of a weight platform assembly of the load cell conditioning assembly of FIG. 1.

FIG. 5 shows an exemplary embodiment of a weight platform assembly 106 of the machine 100. The weight platform assembly 106 may generally be needed to provide a control mechanism for moving the weights 116 from a passive position where the weights cannot condition load cell(s) 10, to an active position where the weights can condition load cell(s) 10. In one or more embodiments, the weight platform assembly 106 includes a rear platform assembly 150, a front platform end cap 152, and two platform arms 154. Locations of intersection between the rear 150, front 152, and arms 154 are held together through the use of corner brackets 158 utilizing a fixation device, such as one or more screws or an adhesive. The weight platform assembly 106 additionally includes two alignment devices 156 which keep load arms 172 of the load arm assembly 110 aligned when the machine 100 conditions load cell(s) 10 as will be discussed in further detail below. When a user is putting load cell(s) 10 into the machine 100 to be conditioned, the arms are floating, but the alignment devices 156 keep the load arms 172 in line with the load cell fixture support 108 while allowing room for the user to easily place the load cell(s) 10. Alignment devices 156 also stop the load arms 172 from swinging should load cells(s) slip out of their placement during conditioning.

Each alignment device 156 may be secured to each of the platform arms 154 through the use of corner brackets 158 utilizing a fixation device, such as one or more screws or an adhesive. The weight platform assembly 106 additionally can include two weight platforms 160, which assist in raising and lowering weights 116 when the machine 100 conditions load cell(s) 10. Each weight platform 160 can be secured to each of the platform arms 154 through the use of a fixation device, such as one or more screws or an adhesive. The weight platform assembly 106 further includes bearing mount assemblies 162 which are utilized to secure the weight platform assembly 106 to the base-mounted shaft supports 124, which allow for the weight platform assembly 106 to move up and down during the conditioning process of machine 100. In one or more embodiments, two bearing mount assemblies 162 are secured to the rear platform assembly 150, while an additional two bearing mount assemblies 162 are secured to the outside edges of each platform arm 154, respectively. A trigger 165 can also be mounted to the rear platform assembly 150 that works in conjunction with the photoelectric sensor assembly 114 to indicate the positioning of the weight platform assembly 106 as will be discussed in more detail below. A lead screw nut block 164 works with the motor mount assembly 112 to move the weight platform assembly up and down.

Figure 6:
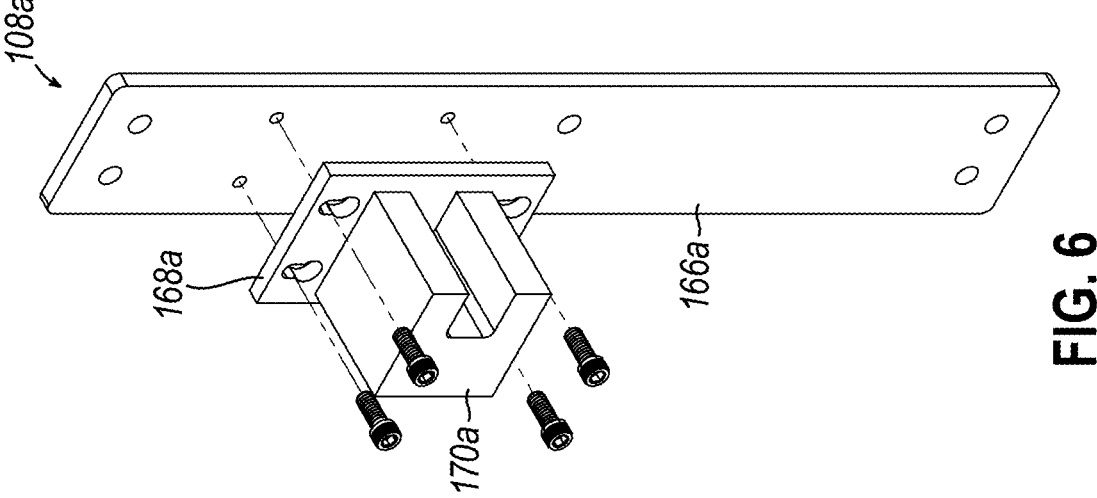
FIG. 6 depicts a perspective view of a load cell fixture support according to a first embodiment of the present disclosure.

FIG. 6 depicts a perspective view of a load cell fixture support 108a according to a first embodiment of the present disclosure. The load cell fixture support 108a may generally be needed to provide a secure position for placement of an end of a load cell, such as load cell 10, prior to load cell 10 being conditioned. In one or more embodiments, the load cell fixture support 108a may be utilized to condition a 76 mm sized load cell 10. One or more load cell fixture supports 108a are securable within apertures 128 of the body 126 of enclosure front assembly 104 through both gravity and tolerance forces. The load cell fixture support 108a may include a body 166a, a fixture base 168a, and a fixture member 170a. The fixture member 170a can be secured to the fixture base 168a through the use of a fixation device, such as one or more screws or an adhesive, and then the fixture base 168a can be secured to the body 166a through the use of a fixation device, such as one or more screws. In use, the first end 15 of a load cell 10 can be placed into a secured position within the fixture member 170a.

Figure 7:
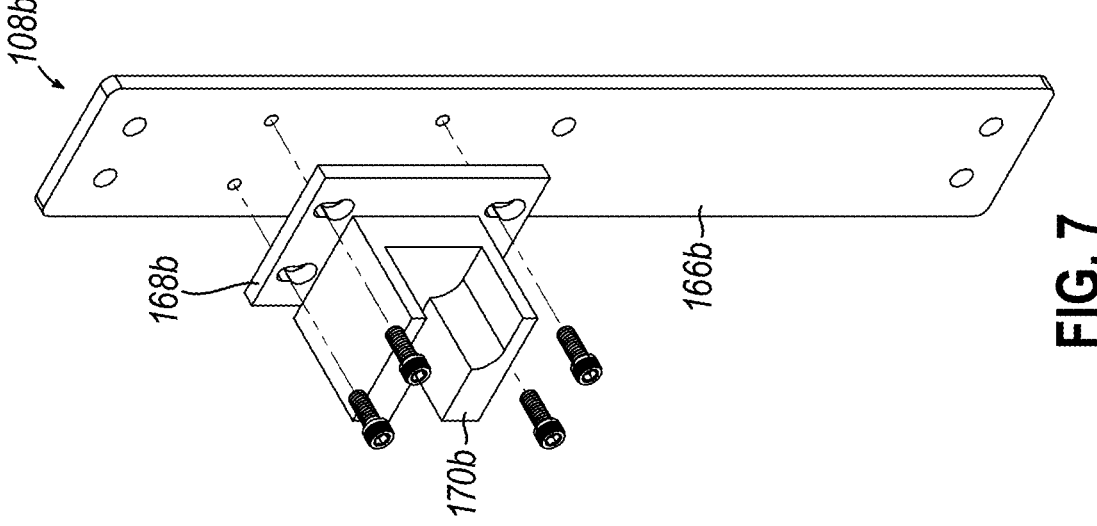
FIG. 7 depicts a perspective view of a load cell fixture support according to a second embodiment of the present disclosure.

FIG. 7 depicts a perspective view of a load cell fixture support 108b according to a second embodiment of the present disclosure. The load cell fixture support 108b may generally be needed to provide a secure position for placement of an end of a load cell, such as load cell 10, prior to load cell 10 being conditioned. In one or more embodiments, the load cell fixture support 108b can be utilized to condition a 130 mm sized load cell 10. One or more load cell fixture supports 108b are securable within apertures 128 of the body 126 of enclosure front assembly 104 through both gravity and tolerance forces. The load cell fixture support 108b may include a body 166b, a fixture base 168b, and a fixture member 170b. In one or more embodiments, the fixture member 170b can be secured to the fixture base 168b, through the use of a fixation device, such as one or more screws or an adhesive, and then the fixture base 168b can be secured to the body 166b through the use of a fixation device, such as one or more screws. In use, an end 15 of a load cell 10 can be placed into a secured position within the fixture member 170b.

In practice, the only difference between load cell fixture support 108a and 108b is that they contain different sized fixture members 170a/170b, which are changed out to accommodate different sized load cell(s) 10. In the field, the fixture members 170a/170b will be already secured to fixture base 168a/168b, and the combination fixture member/fixture base (either 170a/168a or 170b/168b) is secured to body 166a/166b as needed. In one or more embodiments, a machine 100 can be outfitted with either all combination fixture member/fixture base 170a/168a, all combination fixture member/fixture base 170b/168b, or a combination of the two, dependent upon the specific load cell(s) 10 that need conditioned by the end user. Dependent on the fixture member 170 utilized, a specific load arm fixture member 174 (discussed below) will also need utilized.

Figure 8:
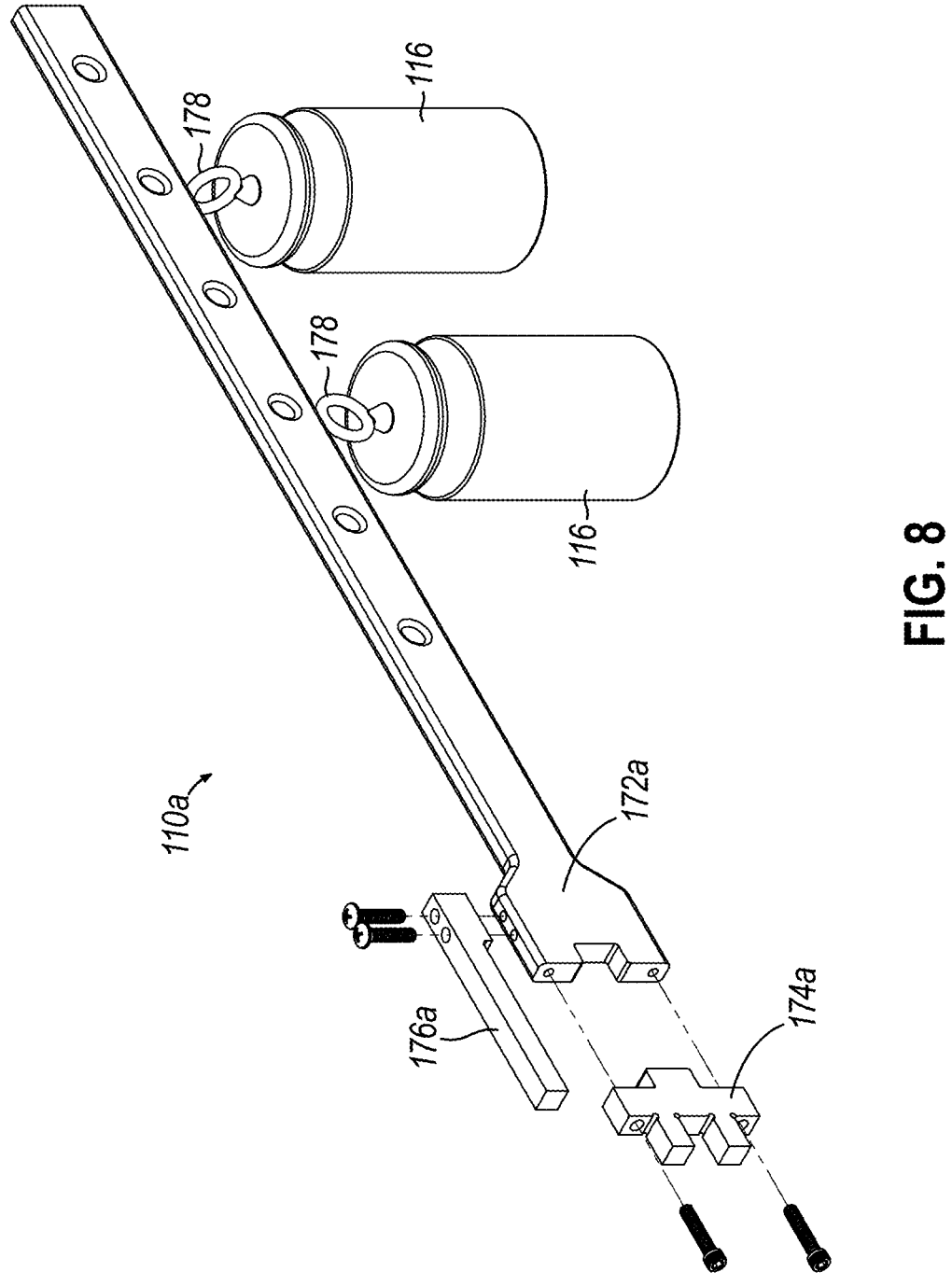
FIG. 8 depicts a perspective view of a load arm assembly according to a first embodiment of the present disclosure.

FIG. 8 depicts a perspective view of a load arm assembly 110a according to a first embodiment of the present disclosure. The load arm assembly 110a may generally be needed to provide a movable position for placement of an end of a load cell, such as load cell 10, prior to load cell 10 being conditioned. In one or more embodiments, the load arm assembly 110a may be utilized in conjunction with a load cell fixture support 108a to condition a 76 mm load cell 10. The load arm assembly 110a includes a load arm 172a, a load arm fixture member 174a, and a handle member 176a. In one or more embodiments, the weights 116 may hang from connecting members 178 that are secured to load arm 172a, such as through the use of a zip-tie (not shown) allowing the weight 116 to hang from a certain distance from the load arm 172. In one or more embodiments, the load arm fixture member 174a can be secured to the load arm 172a through the use of a fixation device, such as one or more screws. In one or more embodiments, the handle member 176a can be secured to the load arm 172a through the use of a fixation device, such as one or more screws. In use, the second end 17 of a load cell 10 may be placed into a non-secured position within the fixture member 174a of the load cell fixture support 110a. Because the load arm assembly 110a holds the second end 17 of a load cell 10 in a non-secured position, the handle member 176a may be utilized to maneuver the position of the load arm fixture member 174a to align with the position established by the secured holding of the first end 15 of the load cell 10 by fixture member 170a.

Figure 9:
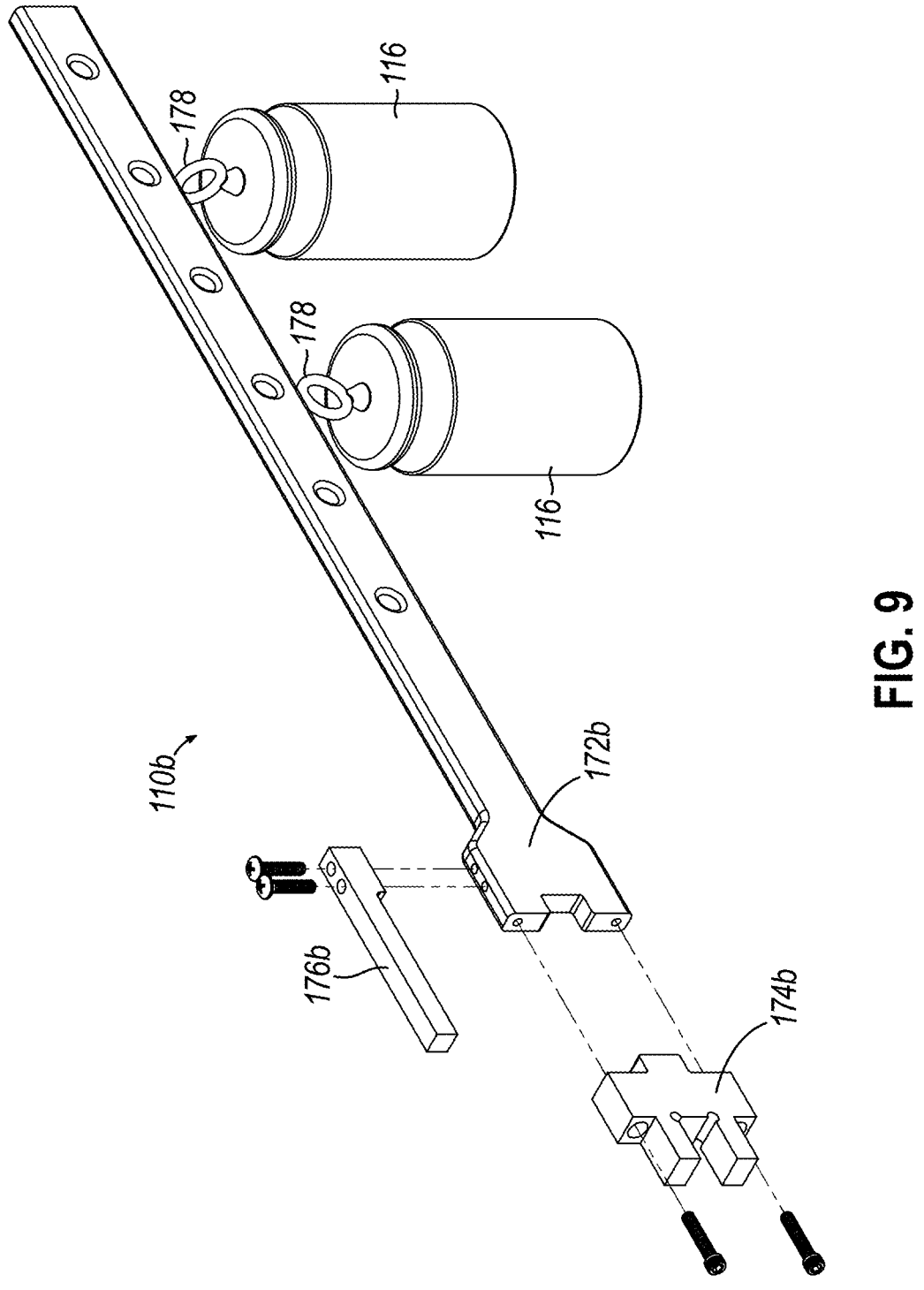
FIG. 9 depicts a perspective view of a load arm assembly according to a second embodiment of the present disclosure.

FIG. 9 depicts a perspective view of a load arm assembly 110b according to a second embodiment of the present disclosure. The load arm assembly 110b may generally be needed to provide a movable position for placement of an end of a load cell, such as load cell 10, prior to load cell 10 being conditioned. In one or more embodiments, the load arm assembly 110b can be utilized in conjunction with a load cell fixture support 108b to condition a 130 mm load cell 10. The load arm assembly 110b includes a load arm 172b, a load arm fixture member 174b, and a handle member 176b. In one or more embodiments, the weights 116 may hang from connecting members 178 that are secured to load arm 172b, such as through the use of a zip-tie (not shown) allowing the weight 116 to hang from a certain distance from the load arm 172b. In one or more embodiments, the load arm fixture member 174b may be secured to the load arm 172b through the use of a fixation device, such as one or more screws. In one or more embodiments, the handle member 176b may be secured to the load arm 172b through the use of a fixation device, such as one or more screws. In use, the second end 17 of a load cell 10 may be placed into a non-secured position within the fixture member 174b of the load cell fixture support 110b. Because the load arm assembly 110b holds the second end 17 of a load cell 10 in a non-secured position, the handle member 176b may be utilized to maneuver the position of the load arm fixture member 174b to align with the position established by the secured holding of the first end 15 of the load cell 10 by fixture member 170b.

In practice, the only difference between load arm assembly 110a and 110b is that they contain different sized fixture members 174a/174b, which are changed out to accommodate different sized load cell(s) 10.

Figure 10:
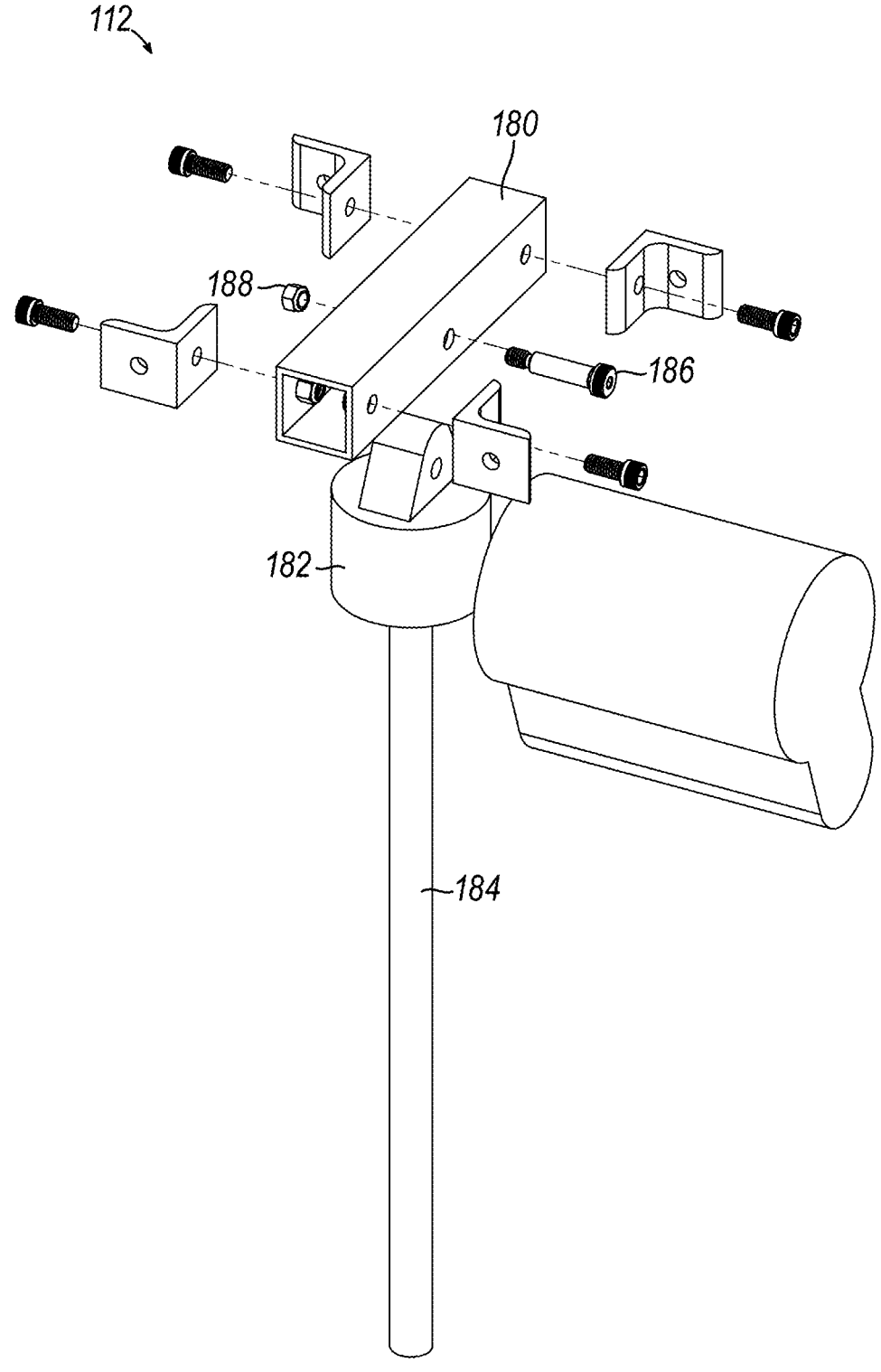
FIG. 10 depicts a perspective view of a motor mount assembly of the load cell conditioning assembly of FIG. 1.

FIG. 10 depicts a perspective view of the motor mount assembly 112 of the load cell conditioning assembly 100. The motor mount assembly 112 may generally be needed to provide a power system for the up and down movements of the weight platform assembly 106. In one or more embodiments, the motor mount assembly 112 includes a mounting body 180 and an actuator 182 with a rotating lead screw connector rod 184. The actuator 182 may be secured to the mounting body 180 through a high strength screw 186 and locknut 188. As can be seen in FIG. 1, the mounting body 180 may be secured between two interior frame support beams 120 through the use of corner brackets 190 utilizing a fixation device, such as one or more screws or an adhesive. The rotating lead screw connector rod 184 connects with the lead screw nut block 164 to power the weight platform assembly 106.

Figure 11:
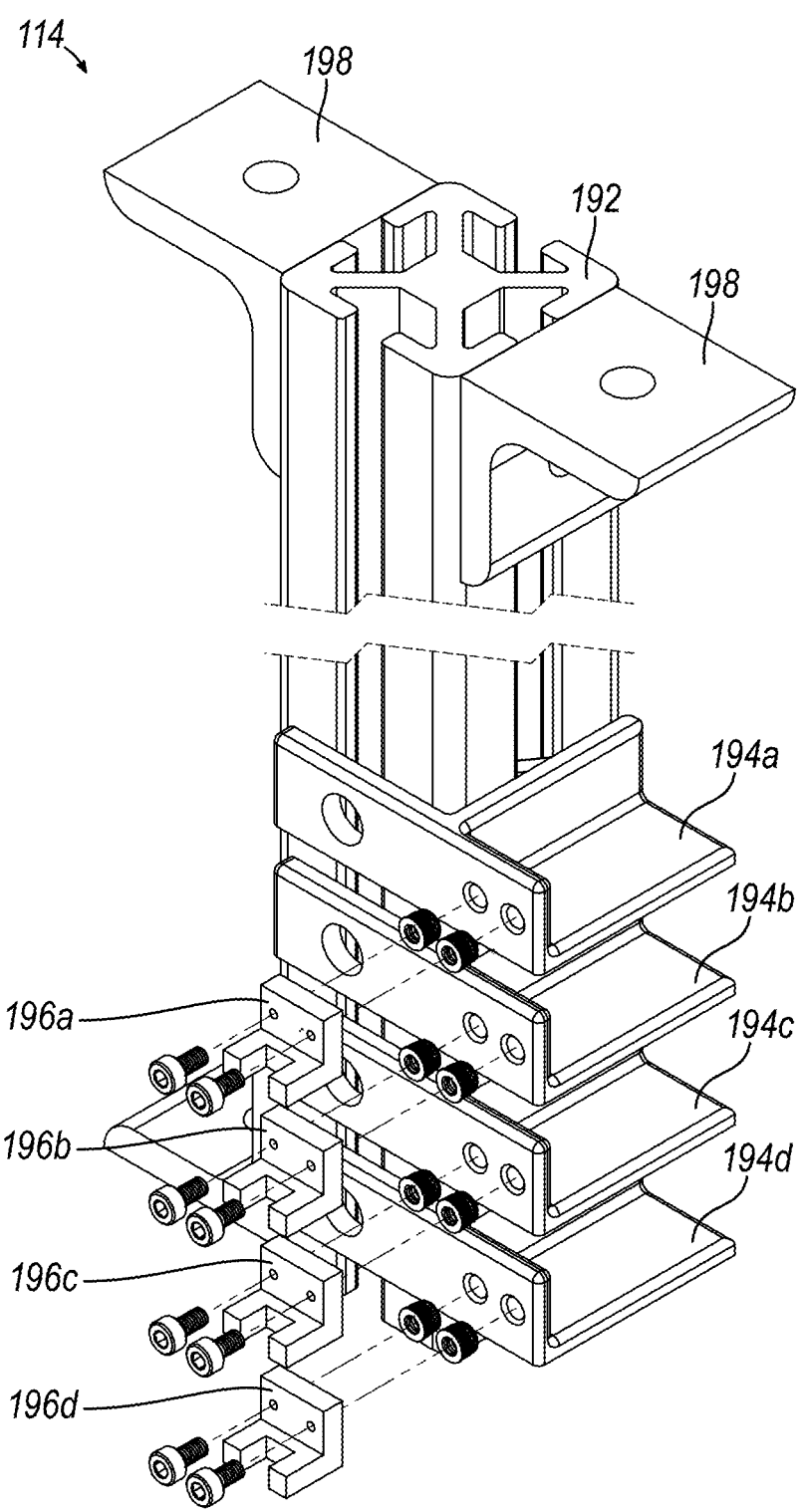
FIG. 11 depicts a perspective view of a photoelectric assembly of the load cell conditioning assembly of FIG. 1.

FIG. 11 depicts a perspective view of a photoelectric assembly 114 of the load cell conditioning assembly 100. The photoelectric assembly 114 may generally be needed to provide an indication system for realizing the position of the weight platform assembly 106 before, during, and after the conditioning process. In one or more embodiments, the photoelectric assembly 114 includes a body member 192, a plurality of photo-interrupter mounts 194, and a plurality of photo-interrupters 196. The body member 192 may be mounted between the top rear exterior frame support beam 118 and the bottom rear exterior support frame 118 of the frame assembly 102 through the use of corner brackets 198 utilizing a fixation device, such as one or more screws or an adhesive. The photo-interrupter mounts 194 are secured to the body member 192 through the use of a fixation device, such as one or more screws or an adhesive. Each photo-interrupter 196 of the plurality of photo-interrupters 196 are respectively secured to one of the photo-interrupter mounts 194 of the plurality of photo-interrupter mounts 194, respectively, through the use of a fixation device, such as one or more screw or an adhesive.

In the embodiment shown in FIG. 11, there are four photo-interrupter mounts 194a, 194b, 194c, and 194d; each carrying a photo-interrupter 196a, 196b, 196c, and 196d, respectively. In this embodiment, photo-interrupter 196a represents a resting home position of the weight platform assembly 106, photo-interrupter 196b represents the position of the weight platform assembly 106 with the weight switch controller 136 placed in a position to condition a 5 kg load cell 10, photo-interrupter 196c represents the position of the weight platform assembly 106 with the weight switch controller 136 placed in a position to condition a 10 kg load cell 100, and photo-interrupter 196d represent a safety stop position of the weight platform assembly.

Each photo-interrupter 196 includes two spaced apart arms, and when the trigger 165 located on the rear platform assembly 150 travels to a position between the two spaced apart arms 196, a light (not shown) can illuminate on the photo-interrupter 196 to provide further indication to the user on the specific position of the weight platform assembly 106. As an example, with the weight switch controller 136 switched to condition a 10 kg load cell 10, with the start controller 144 switched on, actuator 182 of the motor mount assembly 112 can place the weight platform assembly 106 into a position to condition a 10 kg load cell. With the movement of the weight platform assembly 106, the trigger 165 located on the rear platform assembly 150 can move into a position between the two spaced apart arms of photo-interrupter 196c, which can activate the light on photo-interrupter 196c to indicate to the user the correct positioning of the weight platform assembly 106 to condition a 10 kg load cell 10. After the conditioning process has completed, the actuator 182 of the motor mount assembly 112 can move the weight platform assembly 106 back into the home position which can move the trigger 165 into a position between the two spaced apart arms of the photo-interrupter 196a, which can activate the light on photo-interrupter 196a to indicate to the user the correct positioning of the weight platform assembly 106 in the home resting position.

Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A load cell conditioning machine comprising: a frame assembly; a weight platform assembly mounted within the frame assembly; one or more load arm assemblies in operative communication with the weight platform assembly; one or more load cell fixture support assemblies in operative communication with the load arm assembly; and a motor mount assembly mounted within the frame assembly to provide power to the weight platform assembly. One or more load cells are secured within the one or more load cell fixture support assemblies and the one or more load arm assemblies, and wherein the motor mount assembly powers the weight platform assembly to condition the one or more load cells by applying a load beyond a rated capacity of the one or more load cells.

Example 2

The load cell conditioning machine of Example 1, further comprising an enclosure assembly to protect an interior of the frame assembly.

Example 3

The load cell conditioning machine of Example 2, wherein the enclosure assembly includes a control panel to operate the motor mount assembly.

Example 4

The load cell conditioning machine of Example 1, wherein the frame assembly includes a plurality of base-mounted shaft supports, and wherein the plurality of base-mounted shaft supports are in operative communication with the weight platform assembly to allow the weight platform assembly to move up and down along the plurality of base-mounted shaft supports.

Example 5

The load cell conditioning machine of Example 4, wherein the weight platform assembly comprises a platform, one or more retaining devices, a first weight platform, and a second weight platform.

Example 6

The load cell conditioning machine of Example 5, wherein the first weight platform is configured to support a first set of weights and wherein the second weight platform is configured to support a second set of weights.

Example 7

The load cell conditioning machine of Example 6, wherein the motor mount assembly can lower the first weight platform to condition a first type of load cells and wherein the motor mount assembly can lower both the first and second weight platforms to condition a second type of load cells.

Example 8

The load cell conditioning machine of Example 5, wherein the platform includes a plurality of bearing mount assemblies, and wherein the plurality of bearing mount assemblies are in operative communication with the plurality of base-mounted shaft supports to allow the weight platform assembly to move up and down along the plurality of base-mounted shaft supports.

Example 9

The load cell conditioning machine of Example 1, wherein the one or more load cell fixture support assemblies each include a fixture member, and wherein a first end of each of the one or more load cells are placed within the fixture member of the one or more load cell fixture support assemblies prior to the weight platform assembly conditioning the one or more load cells.

Example 10

The load cell conditioning machine of Example 9, wherein the one or more load arm assemblies each include a load arm, a load arm fixture member, and a handle member; and wherein a second end of each of the one or more load cells are placed within the load arm fixture member of the one or more load arm assemblies prior to the weight platform assembly conditioning the one or more load cells.

Example 11

The load cell conditioning machine of Example 10, wherein the weight platform assembly is configured to support a first set of weights and a second set of weights; and wherein each weight of one of the first set of weights or the second set of weights is operatively secured to each load arm of the one or more load arm assemblies.

Example 12

The load cell conditioning machine of Example 1, wherein the weight platform assembly includes a lead screw nut block, wherein the motor mount assembly includes an actuator in operative communication with a rotating lead screw connector rod, and wherein the rotating lead screw connector rod is connected to the lead screw nut block to supply power from the motor mount assembly to the weight platform assembly.

Example 13

A method of conditioning one or more load cells, the method comprising the steps of: providing one or more un-conditioned load cells; providing a load cell conditioning machine; wherein the machine includes: a weight platform assembly mounted within a frame assembly, one or more load arm assemblies in operative communication with the weight platform assembly, one or more load cell fixture support assemblies in operative communication with the load arm assembly, and a motor mount assembly mounted within the frame assembly to provide power to the weight platform assembly; placing a first end of each of the one or more un-conditioned load cells within a fixture member of each of the one or more load cell fixture support assemblies; placing a second end of each of the one or more un-conditioned load cells within a load arm fixture member of each of the one or more load arm assemblies; and utilizing the motor mount assembly to power the weight platform assembly to apply a load beyond a rated capacity of each of the one or more un-conditioned load cells to provide one or more conditioned load cells.

Example 14

The method of Example 13, wherein the provided load cell conditioning machine further includes an enclosure assembly to protect an interior of the frame assembly and wherein the enclosure assembly includes a control panel to operate the motor mount assembly.

Example 15

The method of Example 13, wherein the frame assembly of the provided load cell conditioning machine includes a plurality of base-mounted shaft supports, wherein the weight platform assembly includes a plurality of bearing mount assemblies, and wherein the plurality of bearing mount assemblies are in operative communication with the plurality of base-mounted shaft supports to allow the weight platform assembly to move up and down along the plurality of base-mounted shaft supports.

Example 16

The method of Example 13, wherein the weight platform assembly comprises a platform, one or more retaining devices, a first weight platform, and a second weight platform; and wherein the first weight platform is configured to support a first set of weights and wherein the second weight platform is configured to support a second set of weights.

Example 17

The method of Example 16, wherein the motor mount assembly can lower the first weight platform to condition a first type of un-conditioned load cells and wherein the motor mount assembly can lower both the first and second weight platforms to condition a second type of un-conditioned load cells.

Example 18

The method of Example 13, wherein the weight platform assembly is configured to support a first set of weights and a second set of weights; and wherein each weight of one of the first set of weights or the second set of weights is operatively secured to each load arm of the one or more load arm assemblies.

Example 19

The method of Example 13, wherein the weight platform assembly includes a lead screw nut block, wherein the motor mount assembly includes an actuator in operative communication with a rotating lead screw connector rod, and wherein the rotating lead screw connector rod is connected to the lead screw nut block to supply power from the motor mount assembly to the weight platform assembly.

Example 20

The method of Example 13, wherein the one or more load arm assemblies each further include a handle member, and wherein during the step of placing the second end of each of the one or more un-conditioned load cells, the handle member is utilized to maneuver the load arm fixture members into position to receive the second end of each of the one or more un-conditioned load cells.

It should be understood that any of the examples described herein may include various other features in addition to or in lieu of those described above. By way of example only, any of the examples described herein may also include one or more of the various features disclosed in any of the various references that are incorporated by reference herein.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various versions of the present invention, further adaptations of the methods and systems described herein may be accomplished by appropriate modifications by one of ordinary skill in the art without departing from the scope of the present invention. Several such potential modifications have been mentioned, and others will be apparent to those skilled in the art. For instance, the examples, versions, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:
1. A load cell conditioning machine comprising:
   a. a frame assembly;
   b. a weight platform assembly mounted within the frame assembly;
   c. one or more load arm assemblies in operative communication with the weight platform assembly;
   d. one or more load cell fixture support assemblies in operative communication with the one or more load arm assemblies; and
   e. a motor mount assembly mounted within the frame assembly to provide power to the weight platform assembly;
   wherein one or more load cells are secured within the one or more load cell fixture support assemblies and the one or more load arm assemblies, and wherein the motor mount assembly powers the weight platform assembly to condition the one or more load cells by applying a load beyond a rated capacity of the one or more load cells.

2. The load cell conditioning machine of claim 1, further comprising an enclosure assembly to protect an interior of the frame assembly.

3. The load cell conditioning machine of claim 2, wherein the enclosure assembly includes a control panel to operate the motor mount assembly.

4. The load cell conditioning machine of claim 1, wherein the frame assembly includes a plurality of base-mounted shaft supports, and wherein the plurality of base-mounted shaft supports are in operative communication with the weight platform assembly to allow the weight platform assembly to move up and down along the plurality of base-mounted shaft supports.

5. The load cell conditioning machine of claim 4, wherein the weight platform assembly comprises one or more retaining devices, a first weight platform, and a second weight platform.

6. The load cell conditioning machine of claim 5, wherein the first weight platform is configured to support a first set of weights and wherein the second weight platform is configured to support a second set of weights.

7. The load cell conditioning machine of claim 6, wherein the motor mount assembly can lower the first weight platform to condition a first type of load cells and wherein the motor mount assembly can lower both the first and second weight platforms to condition a second type of load cells.

8. The load cell conditioning machine of claim 5, wherein the weight platform assembly further includes a plurality of bearing mount assemblies, and wherein the plurality of bearing mount assemblies are in operative communication with the plurality of base-mounted shaft supports to allow the weight platform assembly to move up and down along the plurality of base-mounted shaft supports.

9. The load cell conditioning machine of claim 1, wherein the one or more load cell fixture support assemblies each include a fixture member, and wherein a first end of each of the one or more load cells are placed within the fixture member of the one or more load cell fixture support assemblies prior to the weight platform assembly conditioning the one or more load cells.

10. The load cell conditioning machine of claim 9, wherein the one or more load arm assemblies each include a load arm, a load arm fixture member, and a handle member; and wherein a second end of each of the one or more load cells are placed within the load arm fixture member of the one or more load arm assemblies prior to the weight platform assembly conditioning the one or more load cells.

11. The load cell conditioning machine of claim 10, wherein the weight platform assembly is configured to support a first set of weights and a second set of weights; and wherein each weight of one of the first set of weights or the second set of weights is operatively secured to each load arm of the one or more load arm assemblies.

12. The load cell conditioning machine of claim 1, wherein the weight platform assembly includes a lead screw nut block, wherein the motor mount assembly includes an actuator in operative communication with a rotating lead screw connector rod, and wherein the rotating lead screw connector rod is connected to the lead screw nut block to supply power from the motor mount assembly to the weight platform assembly.

* * * * *